(12) United States Patent
Kusuda et al.

(10) Patent No.: US 7,554,624 B2
(45) Date of Patent: Jun. 30, 2009

(54) ELECTRONIC DEVICE WITH PROTECTION PANEL, PROTECTION PANEL, AND METHOD OF FABRICATING PROTECTION PANELS

(75) Inventors: Yasuji Kusuda, Kyoto (JP); Takao Hashimoto, Kyoto (JP); Jun Shimizu, Kyoto (JP); Shinya Yamada, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 240 days.

(21) Appl. No.: 10/584,384

(22) PCT Filed: Dec. 22, 2004

(86) PCT No.: PCT/JP2004/019200
§ 371 (c)(1),
(2), (4) Date: Jun. 26, 2006

(87) PCT Pub. No.: WO2005/064451
PCT Pub. Date: Jul. 14, 2005

(65) Prior Publication Data
US 2007/0181456 A1    Aug. 9, 2007

(30) Foreign Application Priority Data
Dec. 26, 2003    (JP) .............................. 2003-432628

(51) Int. Cl.
*G02F 1/1333* (2006.01)
(52) U.S. Cl. ........................................................ 349/58
(58) Field of Classification Search .................... None
See application file for complete search history.

(56) References Cited
U.S. PATENT DOCUMENTS
7,087,308 B2 * 8/2006 Sakurada et al. ............ 428/432

2001/0038493 A1 * 11/2001 Watanabe et al. ........... 359/609

FOREIGN PATENT DOCUMENTS

| JP | 7-306748 | | 11/1995 |
|---|---|---|---|
| JP | 07306748 | A * | 11/1995 |
| JP | 8-152967 | | 6/1996 |
| JP | 9-034624 | | 2/1997 |
| JP | 10-073805 | | 3/1998 |
| JP | 10073805 | A * | 3/1998 |
| JP | 10-320119 | | 12/1998 |
| JP | 11-191341 | | 7/1999 |
| JP | 2000-270063 | | 9/2000 |

(Continued)

*Primary Examiner*—Michelle R Connelly Cushwa
(74) *Attorney, Agent, or Firm*—Wenderoth, Lind & Ponack, L.L.P.

(57) ABSTRACT

A protection panel for an electronic device display window provided with a protection panel main body is composed of transparent resin and has a decoration layer having a transparent window section, and a transparent lower electrode formed on an upper surface of the protection panel main body. The protection panel main body is bonded, in its peripheral portions, to a transparent resin film on a lower surface of which a transparent upper electrode is formed via an air layer in a position opposite to the transparent lower electrode. The decoration layer is formed on at least one surface of a transparent resin cover film bonded to an upper surface of the transparent resin film.

17 Claims, 12 Drawing Sheets

| | FOREIGN PATENT DOCUMENTS | | | | |
|---|---|---|---|---|---|
| JP | 2001-318612 | 11/2001 | JP | 2003-036143 | 2/2003 |
| JP | 2002-202849 | 7/2002 | JP | 2003-255855 | 9/2003 |
| JP | 2002202849 A * | 7/2002 | | | |

* cited by examiner

ELECTRONIC DEVICE WITH PROTECTION PANEL, PROTECTION PANEL, AND METHOD OF FABRICATING PROTECTION PANELS

TECHNICAL FIELD

The present invention relates to an electronic device with protection panel, a protection panel for electronic device display window, and a method of fabricating protection panels for electronic device display windows.

BACKGROUND ART

Casings used in electronic devices such as portable telephones and smart phones are constructed in general in a flat shape by combining a front casing and a rear casing composed of synthetic resin. In detail, a protection panel for protecting a liquid crystal display window is fixed to the surface of the front casing by fusion bonding or the like. In the prior art, this protection panel has been constructed as a transparent and colorless resin panel. However, with growing demand for fashionable electronic devices, decoration such as fringe decoration fabricated by printing is frequently added as disclosed in Japanese unexamined patent publication No. 2001-318612. In recent years, promising portable telephones comprise a touch panel as a next-generation interface. An example of such a portable telephone provided with a touch panel is disclosed in Japanese unexamined patent publication No. 2000-270063.

Patent Document 1: JP2000-270063(A)

Patent Document 2: JP2001-318612(A)

Nevertheless, in the prior art described in Japanese unexamined patent publication No. 2001-318612, a liquid crystal display window of an electronic device such as a portable telephone is protected by a protection panel constituting a part of a front casing. Thus, if a touch panel were simply built inside the casing, touch input operation would be blocked by the protection panel, so that the touch panel could not be employed. Thus, in the surface of the front casing, in place of fixing the protection panel which covers the touch input operation surface of the touch panel, a front panel provided with an opening for exposing the touch input operation surface needs to be provided by fusion bonding or the like as disclosed in Japanese unexamined patent publication No. 2000-270063 or the like.

As shown in FIGS. 14 and 15, when such a front panel provided with an opening for exposing a touch input operation surface is used, the periphery of an opening 66 of a front panel 67 covers the outside of the operation region of a touch panel 60. This causes a level difference equal to the thickness of the front panel 67 to occur between a decoration section 70 of the outer surface of the front panel 67 and a touch input operation surface 62. Thus, a pen, a finger, or the like is guided by the level difference edges, and thereby slides frequently on the same portion along the edges of the opening 66 of the front panel 67 of the touch input operation surface 62. This has caused a problem that the touch input function is degraded easily. Further, there has been a problem that when fouling such as fats and oils which have adhered to the touch input operation surface 62 during the input or the like is to be wiped off, the portion near the edges of the opening 66 of the front panel 67 is difficult to be wiped completely.

Further, as shown in FIG. 15, the touch panel 60 is fixed to the surface of a display 65 almost directly via an adhesion layer 71. Thus, stress applied from the outside to the touch panel 60 is transmitted directly to the display. This has caused a problem in that the display 65 easily suffers damage.

SUMMERY OF THE INVENTION

Thus, an object of the present invention is to solve the above issues and provide a protection panel for an electronic device display window in which: touch input is allowed on an electronic device display window; the touch input does not slide on the same portion of the operation surface; fouling such as fats and oils is easily wiped off; and the panel is hard to damage.

In order to achieve the above object, the constitution of the present invention is as follows:

According to a first aspect of the present invention, there is provided an electronic device with protection panel comprising: a protection panel in which a decoration layer having a transparent window section is formed; a casing in which the protection panel is fitted into a panel fitting section having an opening, without a gap therebetween and such that outer surfaces of the protection panel and the casing are flush with each other; and a display device located on a lower side of the protection panel and arranged so as to be visually recognizable from an outside through the transparent window section, The protection panel comprises: a transparent protection panel main body an upper surface of which is provided with a transparent lower electrode and a lower circuit provided around the transparent lower electrode so as to be covered by the decoration layer; a movable electrode film in which a transparent upper electrode provided in a position opposite to the transparent lower electrode in the protection panel main body and an upper circuit provided around the transparent upper electrode so as to be covered by the decoration layer are provided on a lower surface of a transparent resin film, the transparent resin film being arranged on an upper side of the protection panel main body via an air layer, in which peripheral portions thereof are bonded to the transparent protection panel main body; and a cover film which is made of transparent-resin, and is provided on an upper surface of the transparent resin film, and on at least one surface of which the decoration layer is formed.

According to a second aspect of the present invention, there is provided an electronic device with the protection panel of the first aspect, wherein the decoration layer is formed on a lower surface of the cover film.

According to a third aspect of the present invention, there is provided an electronic device with the protection panel of the second aspect, wherein the cover film has the same outer dimensions as the transparent resin film and the protection panel main body.

According to a fourth aspect of the present invention, there is provided an electronic device with the protection panel of any one of the first to third aspects, wherein an upper surface of the cover film is treated by hard coat processing, low reflection processing, antifouling processing, or any combination thereof.

According to a fifth aspect of the present invention, there is provided a protection panel for electronic device display window comprising: a transparent protection panel main body having an upper surface which is provided with a transparent lower electrode and a lower circuit provided around the transparent lower electrode; a movable electrode film in which a transparent upper electrode provided in a position opposite to the transparent lower electrode in the protection panel main body and an upper circuit provided around the transparent upper electrode so as to be covered by a decoration layer are provided on a lower surface of a transparent resin film on at least one side of which the decoration layer having a transparent window section and covering the lower circuit is formed, and in which peripheral portions thereof are bonded and arranged on the transparent protection panel main body such that an air layer is formed on an upper side of the protection panel main body; and a cover film which is made of a transparent-resin and is provided on an upper surface of the transparent resin film, and on at least one surface of which the decoration layer is formed. The protection panel is fitted and retained in a panel fitting section having an opening in a casing, without a gap and such that outer surfaces of the protection panel and the casing are flush with each other, so that a display device, which is located on a lower side of the protection panel and arranged so as to be visually recognizable from an outside through the transparent window section, is protected.

According to a sixth aspect of the present invention, there is provided a protection panel of the fifth aspect, wherein the decoration layer is formed on a lower surface of the cover film.

According to a seventh aspect of the present invention, there is provided a protection panel of the sixth aspect, wherein the cover film has the same outer dimensions as the transparent resin film and the protection panel main body.

According to an eighth aspect of the present invention, there is provided a protection panel of any one of the fifth to seventh aspects, wherein an upper surface of the cover film is treated by hard coat processing, low reflection processing, antifouling processing, or any combination of these.

According to a ninth aspect of the present invention, there is provided a method of fabricating protection panels for electronic device display window, comprising: forming a plurality of transparent lower electrodes and a plurality of lower circuits provided around the transparent lower electrodes, on an upper surface of a transparent plate member; forming transparent upper electrodes provided in positions opposite to the transparent lower electrodes and upper circuits formed around the transparent upper electrodes, on a lower surface of a transparent resin film, on at least one side of which decoration layer are formed so as to mask respective lower circuits, each decoration layer having a transparent window section; bonding the plate member and the transparent resin film in such a manner that peripheral portions of the transparent lower electrodes and the transparent upper electrodes are bonded together while an air layer is formed on an upper side of the plate member, and bonding a transparent-resin made cover film to the transparent resin film so as to bring into the transparent-resin made cover film of which the decoration layers, each of which has the transparent window section and masks each upper circuit and each lower circuit, are formed on at least one surface, into a position opposite of the transparent resin film surface which is provided on an upper surface of said transparent resin film and on which the transparent upper electrodes are provided; and cutting together the plate member, the transparent resin film, and the cover film having been bonded, in an outside of the transparent lower electrodes and the transparent upper electrodes and along an inner periphery of the decoration layer, so that protection panels are obtained.

According to a tenth aspect of the present invention, there is provided a method of fabricating protection panels for electronic device display window of the ninth aspect, wherein the decoration layers are formed by contacting and bonding the transparent-resin made cover film, of which the decoration layers are constituted on at least one surface, to a position opposite of the transparent resin film surface which is provided on an upper surface of the transparent resin film and on which the transparent upper electrodes are provided.

An electronic device with protection panel and a protection panel for electronic device display window according to the present invention have the configurations described above, and hence have the following advantageous effects.

That is, in the protection panel for electronic device display window according to the present invention, the protection panel main body has the transparent lower electrode, and is bonded to the transparent resin film in peripheral portion thereof. The transparent resin film has the transparent upper electrode formed on the lower surface of the film and opposing to the transparent lower electrode via the air layer. Thus, the protection panel main body is provided with a touch input function in its front surface thereof. As a result, when the protection panel is attached to the surface of a front casing of an electronic device such as a portable telephone, touch input is allowed on the electronic device display window thereof.

Further, no level difference is present between the decoration section of the outer surface and the surface for touch input operation of the protection panel. This permits unbiased sliding on the touch input operation window, and hence avoids easy degradation in the touch input function. Further, the absence of the above-mentioned level difference permits easy wipe-off of fouling such as fats and oils, and realizes thickness reduction of the device.

Detailed Description of the Invention

Figure 1:
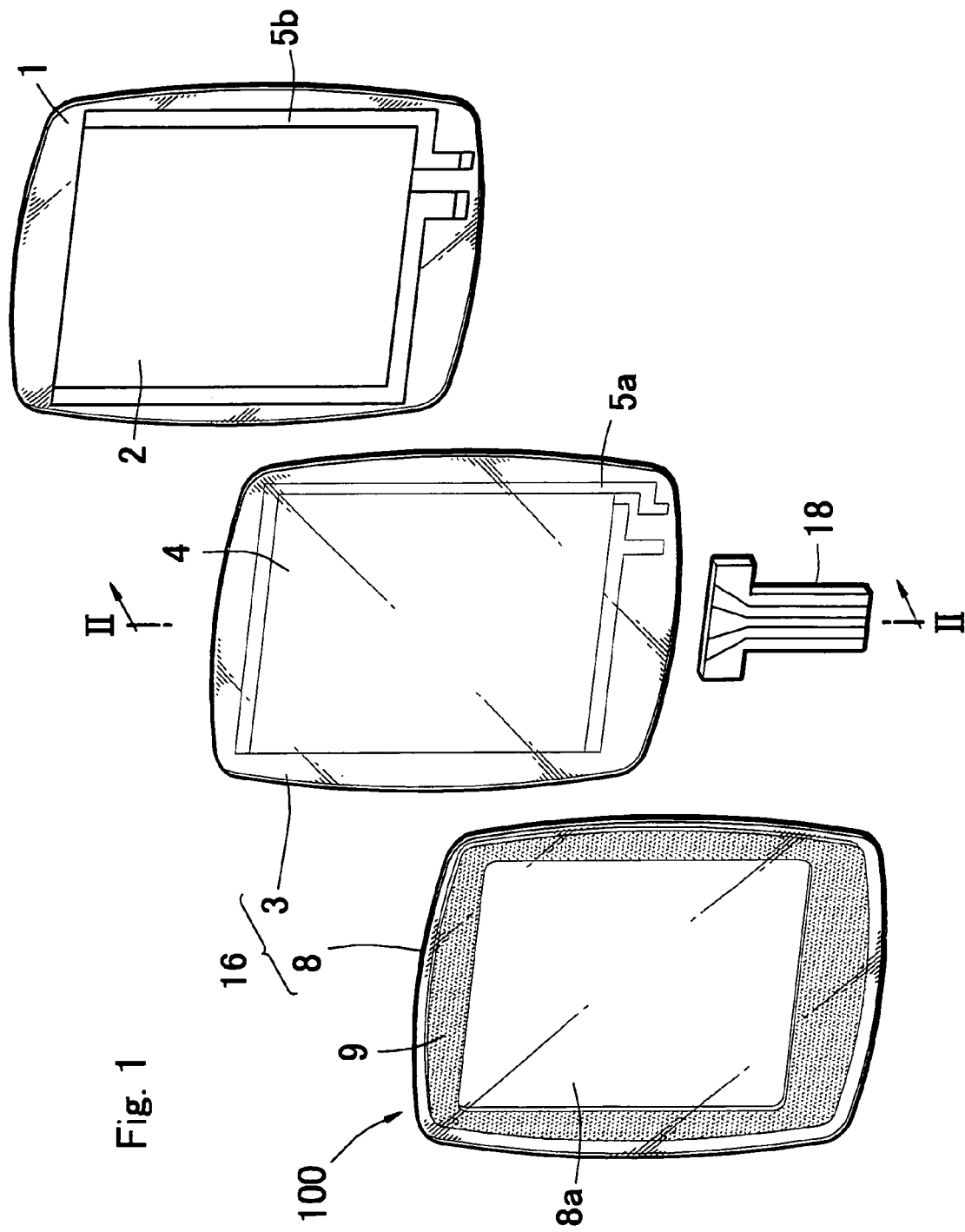
FIG. 1 is an exploded view showing an embodiment of a protection panel for an electronic device display window according to the present invention.
Figure 2:
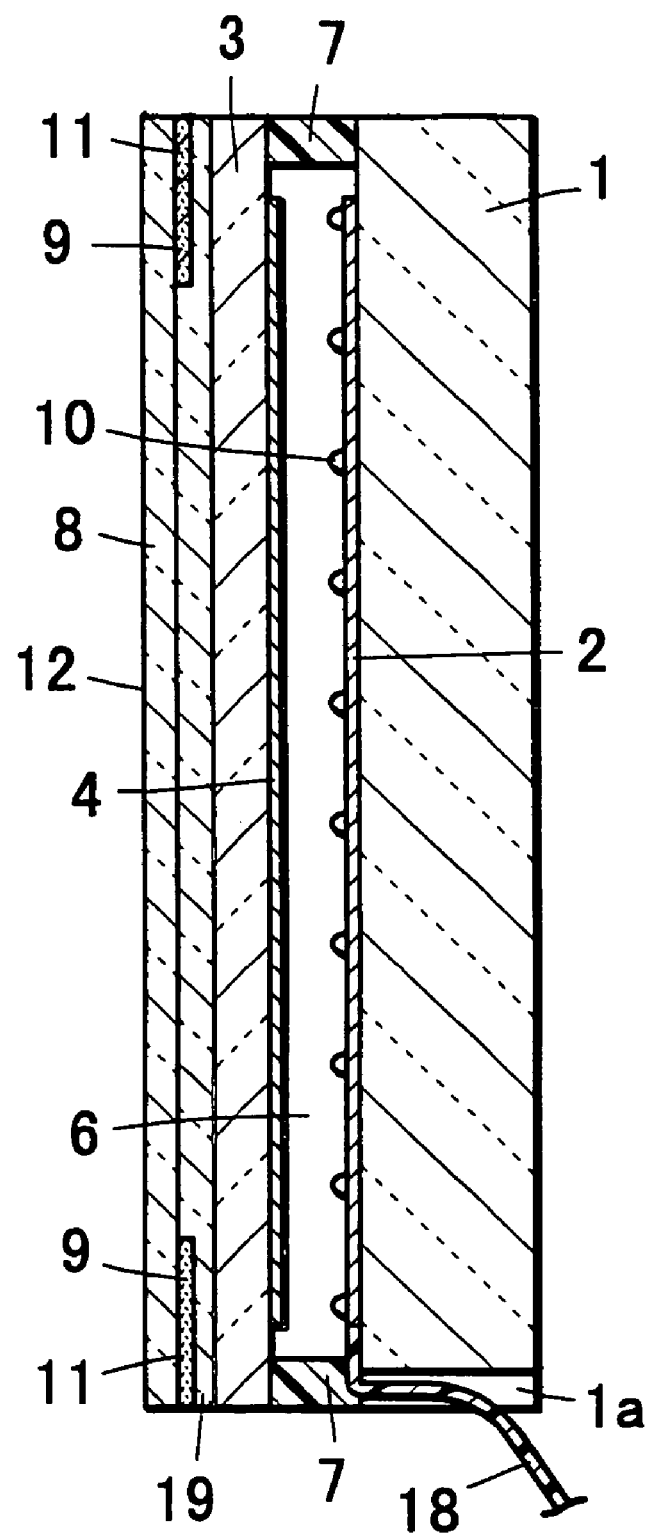
FIG. 2 is a cross sectional view of the protection panel for the electronic device display window of FIG. 1, taken along a line II-II.

Before the description of the present invention proceeds, it is to be noted that like parts are designated by like reference numerals throughout the accompanying drawings. A first embodiment according to the present invention is described below in detail with reference to the drawings. FIG. 1 is an exploded view showing an embodiment of a protection panel for an electronic device display window according to the invention. FIG. 2 is a cross sectional view taken along a line II-II of FIG. 1.

Figure 11:
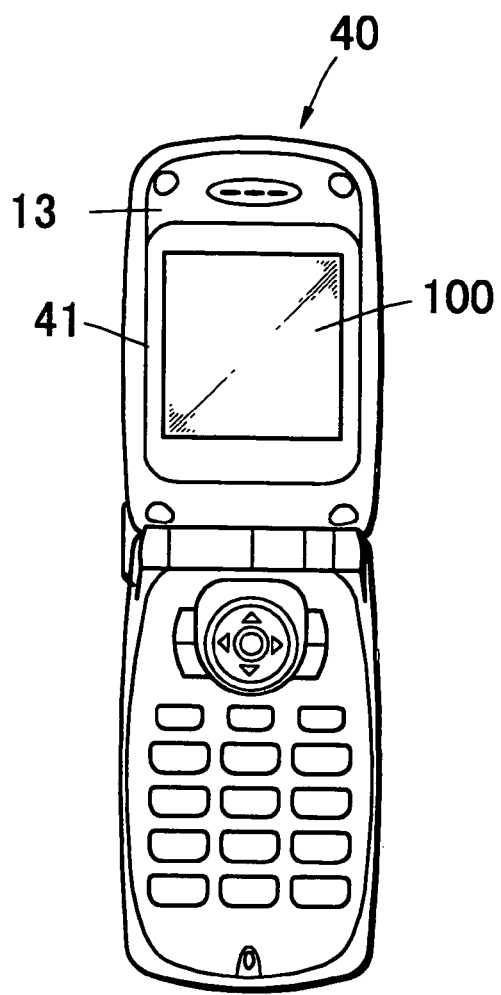
FIG. 11A is a diagram showing the front outer configuration of a portable telephone employing the protection panel for the electronic device display window of FIG. 1 or 5.
FIG. 11B is a diagram showing the rear-side outer configuration of the portable telephone of FIG. 11A.
Figure 11:
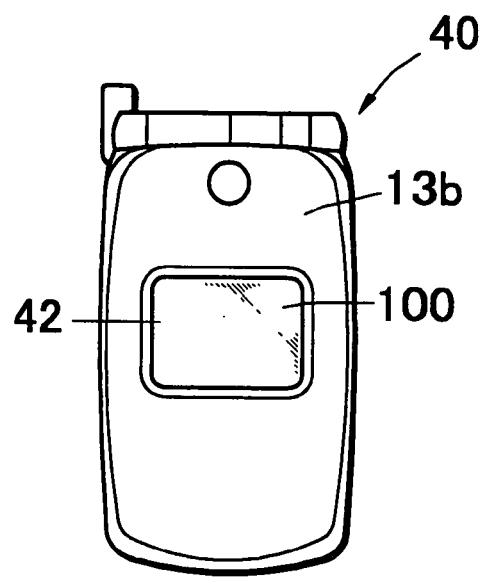

A protection panel 100 for electronic device display window shown in FIG. 1 is used as a protection panel for display sections 41 and 42 provided respectively in a front casing 13 and a rear casing 13b serving as a casing of a portable telephone 40 shown in FIGS. 11A and 20 11B. In each of the display sections 41 and 42, a display device such as a liquid crystal display and an organic EL display is provided in the inside. The protection panel according to the present embodiment is used for protecting the surface of each display. However, the protection panel according to the present embodiment does not need to be provided in each of the display sections 41 and 42 of the front casing 13 and the rear casing 13b, and may be provided only in one requiring a protection panel. The protection panel 100 for electronic device display window comprises: a protection panel main body 1 having an upper surface which is provided with a transparent lower electrode 2 and a lower circuit 5b; a transparent resin film 3 having a lower surface which is provided with a transparent upper electrode 4 and an upper circuit 5a; and a transparent resin cover film 8 having at least one surface which is provided with a decoration layer 9 having a transparent window section 8a. The transparent resin film 3 and the cover film 8 are bonded together so as to constitute a movable electrode film 16 of a touch panel, as described later.

The protection panel main body 1 and the transparent resin film 3 are bonded to each other in their peripheral portions by a double-sided adhesive tape 7 in a manner sandwiching an air layer between the electrodes. The transparent resin cover film 8 is bonded to the upper surface of the transparent resin film 3 by a transparent adhesive 19.

In each of the protection panel main body 1 and the transparent resin film 3, the lower circuit 5b or 5a having a predetermined pattern such as a bus bar and other wiring is formed on the same surface as the transparent lower electrode 2 and the transparent upper electrode 4. These circuits are outputted through a film connector 18 to the outside. Spacers 10 are formed between the protection panel main body 1 and the transparent resin film 3 so as to prevent incorrect contact between the electrodes 2 and 4 provided on the mutually opposing surfaces.

The spacers 10 can be fabricated by forming transparent photo-hardening resin into the shape of fine dots by a photography process. Alternatively, the spacers 10 may be fabricated by forming a large number of fine dots by printing.

The protection panel main body 1 is composed of a material having good visibility and capable of protecting from damage the display 15 such as a liquid crystal panel and an organic EL panel. Suitable materials include general purpose resins such as polystyrene-family resins, polyolefin-family resins, an ABS resin, an AS resin, acrylic-family resins, and an AN resin. Suitable materials further include: general purpose engineering plastics such as polyphenylene oxide-polystyrene family resins, polycarbonate-family resins, polyacetal-family resins, a polycarbonate denatured polyphenylene ether resin, a polybutylene terephthalate resin, and a super high molecular weight polyethylene resin; and super engineering plastics such as a polysulfone resin, polyphenylene sulfide-family resins, polyphenylene oxide-family resins, a polyarylate resin, a polyetherimide resin, a polyimide resin, a liquid crystal polyester resin, and polyaryl-family heat resistant resins.

In the protection panel main body 1, the transparent lower electrode 2 may be formed with sandwiching a transparent film as described later. This transparent film may be composed of an engineering plastic of polycarbonate family, polyamide family, polyether ketone family, or the like, or a resin of acrylic family polyethylene terephthalate family, polybutylene terephthalate family, or the like.

The transparent resin film 3 may be composed of an engineering plastic of polycarbonate family, polyamidefamily, polyether ketone family, or the like, or a resin film of acrylic family, polyethylene terephthalate family, polybutylene terephthalate family, or the like.

Each of the transparent lower electrode 2 and the transparent upper electrode 4 is composed of a transparent electrically conductive film. This transparent electrically conductive film may be composed of: a metal oxide such as tin oxide, indium oxide, antimony oxide, zinc oxide, cadmium oxide, and ITO; a metal such as gold, silver, copper, tin, nickel, aluminum, and palladium; or a thin film of electrically conductive polymer. In an example of the method of forming the transparent lower electrode 2 and the transparent upper electrode an electrically conductive coating is formed over each of the protection panel main body 1 and the transparent resin film 3 by means of vacuum deposition, sputtering, ion plating, CVD, a roll coater method, or the like. Then, unnecessary portions are removed by etching. In the etching, by photolithography, a screen method, or the like, a resist is formed in a portion which is desired to remain as an electrode. After that, the substrate is immersed into an etching solution such as hydrochloric acid, or alternatively the etching solution is sprayed onto the substrate. As a result, the electrically conductive coating of the portion where the resist is not formed is removed. After that, the resist is immersed into a solvent so as to be swollen or dissolved and thereby removed. Alternatively, laser etching may be used.

The upper circuit 5a and the lower circuit 5b are formed of: a metal such as gold, silver, copper, and nickel; or an electrically conductive paste such as carbon. Employable methods of forming these circuits include: printing methods such as screen printing, offset printing, gravure printing, and flexo printing; a photoresist method; and a brush painting method. In the formation of the upper circuit 5a and the lower circuit 5b, fringe reduction does not need to be concerned in contrast to the case of a touch panel. This is because in the protection panel according the present embodiment, the liquid crystal display window of the electronic device such as a portable telephone constitutes a part of the front casing 13, and is not restricted by the size of the display 15.

An end portion of the film connector (circuit sheet) 18 is inserted between the protection panel main body 1 and the transparent resin film 3, and then connected to the outputs of the upper circuit 5a and the lower circuit 5b by thermocompression bonding. When a notch 1a is formed in the protection panel main body 1 as shown in FIG. 2, the film connector (circuit sheet) 18 is easily assembled (arranged in the notch 1a) toward the rear surface.

Similarly to the transparent resin film 3, the transparent resin cover film 8 may be composed of an engineering plastic of polycarbonate family, polyamide family, polyether ketone family, or the like, or a resin film of acrylic family, polyethylene terephthalate family, polybutylene terephthalate family, or the like.

A decoration layer 9 having a transparent window section 8a is formed on at least one surface of the transparent resin cover film 8. This transparent resin cover film is located on the upper surface of the transparent resin film 3 provided with the transparent upper electrode 4. In a prior art protection panel, a decoration layer 9 having a transparent window section 8a is formed on the lower surface of a protection panel main body 1. In contrast, in the protection panel according to the invention as described above, opaque wiring 5 is formed on the upper surface of the protection panel main body 1 and on the lower surface of the transparent resin film 3. Thus, in order to visually cover the wiring, the transparent resin cover film having the decoration layer is arranged on the surface of the transparent resin film 3 as described above. The portion covered by the decoration layer 9 constitutes a decoration section 11, while the portion not covered by the decoration layer 9 serves as the transparent window section 8a.

The decoration layer 9 is usually formed as a print layer in the protection panel. The print layer may be fabricated using a binder composed of a resin such as polyvinyl chloride-family resins, polyamide-family resins, polyester-family resins, polyacrylic-family resins, polyurethane-family resins, polyvinyl acetal-family resins, polyester urethane-family resins, cellulose ester-family resins, and an alkyd resin, and using coloring ink containing a pigment or a dye of appropriate color as colorant. The method of forming the print layer may be an ordinary printing method such as offset printing, gravure printing, and screen printing. When multicolor printing or gradation expression is to be used, offset printing and gravure printing are suitable. In monochrome printing, a coating method such as gravure coating, roller coating, and comma coating may be employed. Depending on the decoration to be expressed, the print layer may be provided on the entire surface or on a part of the surface.

The decoration layer 9 may be composed of a metal thin film layer or alternatively a combination of a print layer and a metal thin film layer. The metal thin film layer is used for expressing metallic luster in the decoration layer 9, and can be formed by vacuum deposition, sputtering, ion plating, plating, or the like. In this case, depending on the metallic luster color to be expressed, a metal such as aluminum, nickel, gold, platinum, chromium, iron, copper, tin, indium, silver, titanium, lead, and zinc may be used as well as an alloy or a compound of these metals. The metal thin film layer is usually formed partly on the surface of the decoration layer 9. When such a metal thin film layer is provided on the surface of the decoration layer 9, a pre-anchoring layer or a post-anchoring layer may be provided on the surface of the decoration layer 9 so as to improve the adhesivity to other layers.

The decoration layer 9 may be formed on any one of the surfaces of the transparent resin cover film 8. However, the decoration layer is preferably formed on the lower surface of the cover film, and bonded in a manner so as to be in contact with the upper surface of the transparent resin film 3. This prevents a finger or a pen from directly coming in contact with the decoration layer, and hence avoids wear in the decoration layer.

Figure 3:
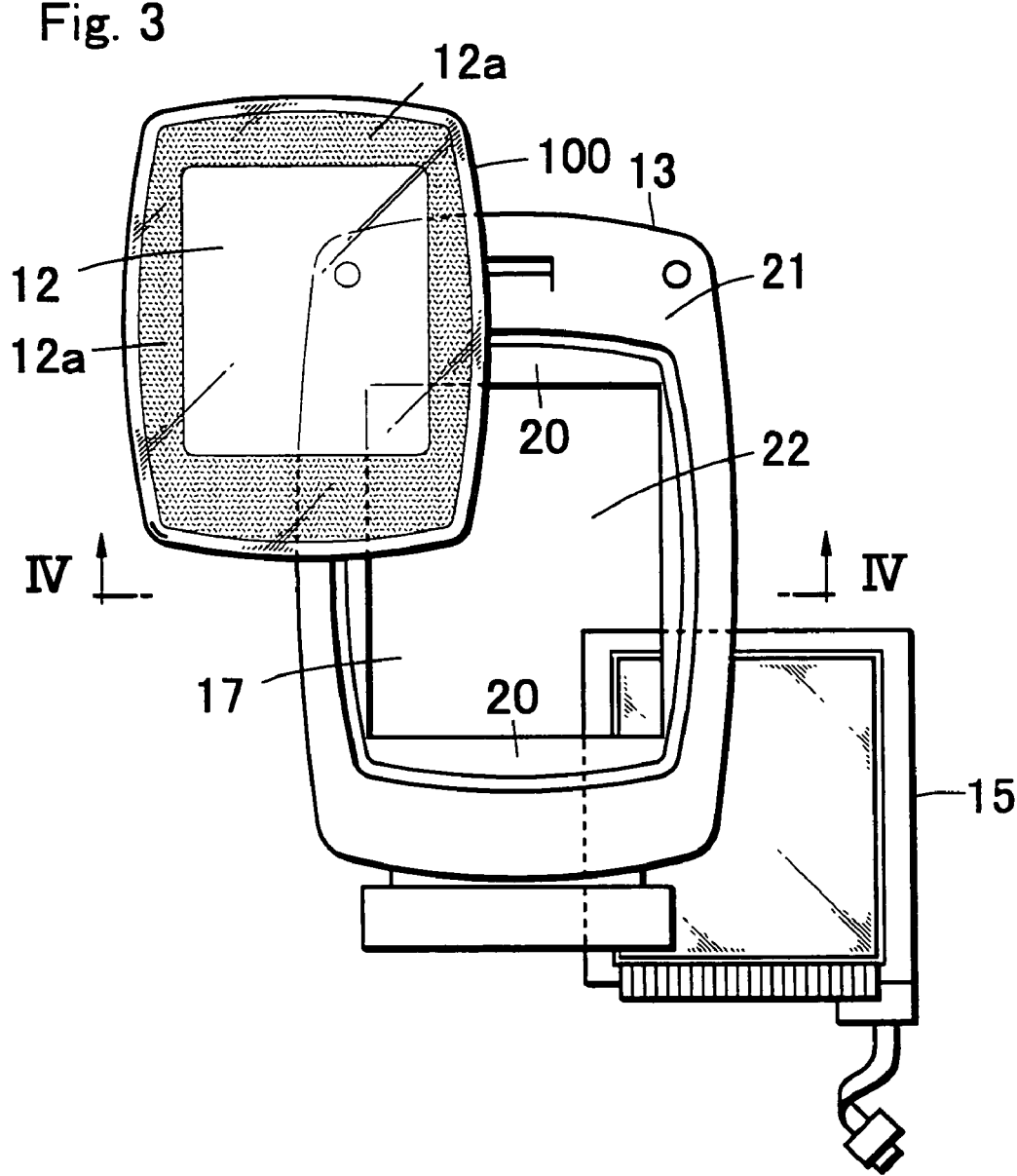
FIG. 3 is an exploded view showing an example of the mounting structure of a front casing employing the protection panel for a electronic device display window.

As a result of the configuration described above, the protection panel is provided with a touch input function in the front surface of the protection panel main body 1. That is, in contrast to the prior art, no touch panel is necessary inside the casing. According to this feature, even when the protection panel 100 is attached to the surface of the front casing 13 of an electronic device such as a portable telephone as shown in FIG. 3, touch input is allowed in the electronic device display window.

Figure 4:
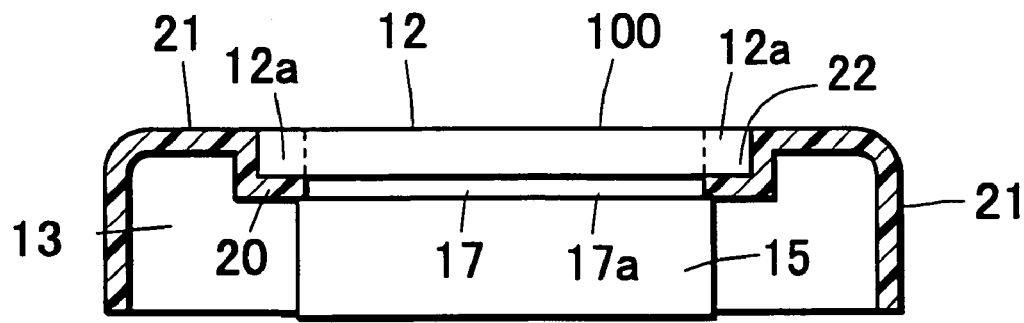
FIG. 4 is a cross sectional view showing an embodiment of the mounting structure of the front casing of FIG. 3.

FIG. 4 is a cross sectional view showing an embodiment of the mounting structure of a front casing employing the protection panel for electronic device display window of FIG. 1. As shown in FIG. 4, the front casing 13 has a recess 22 into which the protection panel 100 is fitted. In a preferred configuration, the depth of the recess 22 equals approximately the thickness of the protection panel 100. An opening 17 is formed in a bottom surface of the recess 22. A peripheral portion of the bottom surface supports a peripheral portion 12a of the protection panel 100 where the decoration layer is provided.

A display device 15 is arranged just under the opening 17. As shown in FIG. 4, the protection panel 100 is supported by the casing 13 only in the peripheral portion thereof. This allows the touch input operation surface 12 of the protection panel 100 to be constructed approximately in the same size as the opening 17. By virtue of this, almost the entirety of the visually recognizable region of the display which can be recognized visually from the outside of the casing 13 can serve as the touch input operation surface 12. Further, as seen from FIG. 4, no level difference is present between the casing surface 21 and the touch input operation surface 12. This permits unbiased sliding on the touch input operation surface 12, and hence avoids easy degradation in the touch input function. Further, the absence of the above-mentioned level difference permits easy wipe-off of fouling such as fats and oils, and realizes thickness reduction of the device.

Further, as shown in FIG. 4, the protection panel 100 is fitted from the outside of the front casing so that the recess 22 supports the protection panel. Then, the protection panel 100 is not directly in contact with the display 15 so that a clearance is formed between the protection panel and the display by the amount equal to the thickness of the recess 22 of the front casing 13. Thus, even when an external force is applied from the outside of the protection panel 100, the external force is not transmitted to the surface of the display 15 so that breakage is avoided in the display.

Figure 5:
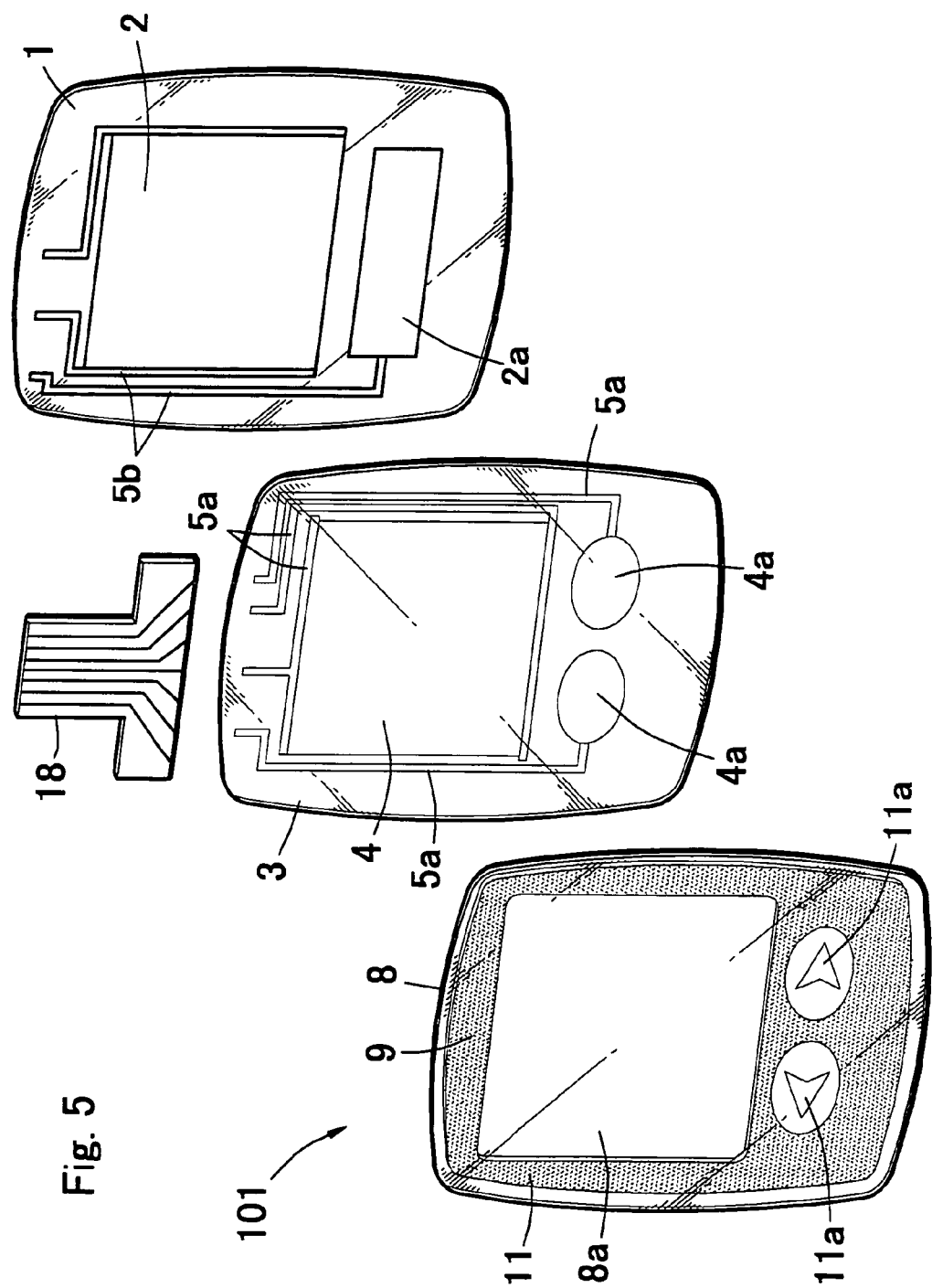
FIG. 5 is an exploded view showing another embodiment of a protection panel for an electronic device display window according to the present invention.

The protection panel for electronic device display window according to the present invention is not limited to the above-mentioned configuration. For example, the decoration section 11 may contain key input patterns 11a (see FIG. 5). In this case, transparent lower electrodes 2 and 2a and transparent upper electrodes 4 and 4a are formed not only in the lower region of a transparent window section 8a but also in the lower region of the key input patterns 11a.

An example of a method of fabricating protection panels shown in FIG. 1 is described below.

The protection panel of FIG. 1 may be fabricated as follows. That is, a movable electrode film 16 provided with a plurality of decoration layers 9, upper transparent electrodes 4, and the like is bonded, in a predetermined position, to a fixed electrode board 27 provided with a plurality of protection panel main bodies 1, in order to obtain an integrated sheet. Then, the integrated sheet is cut up.

Figure 6:
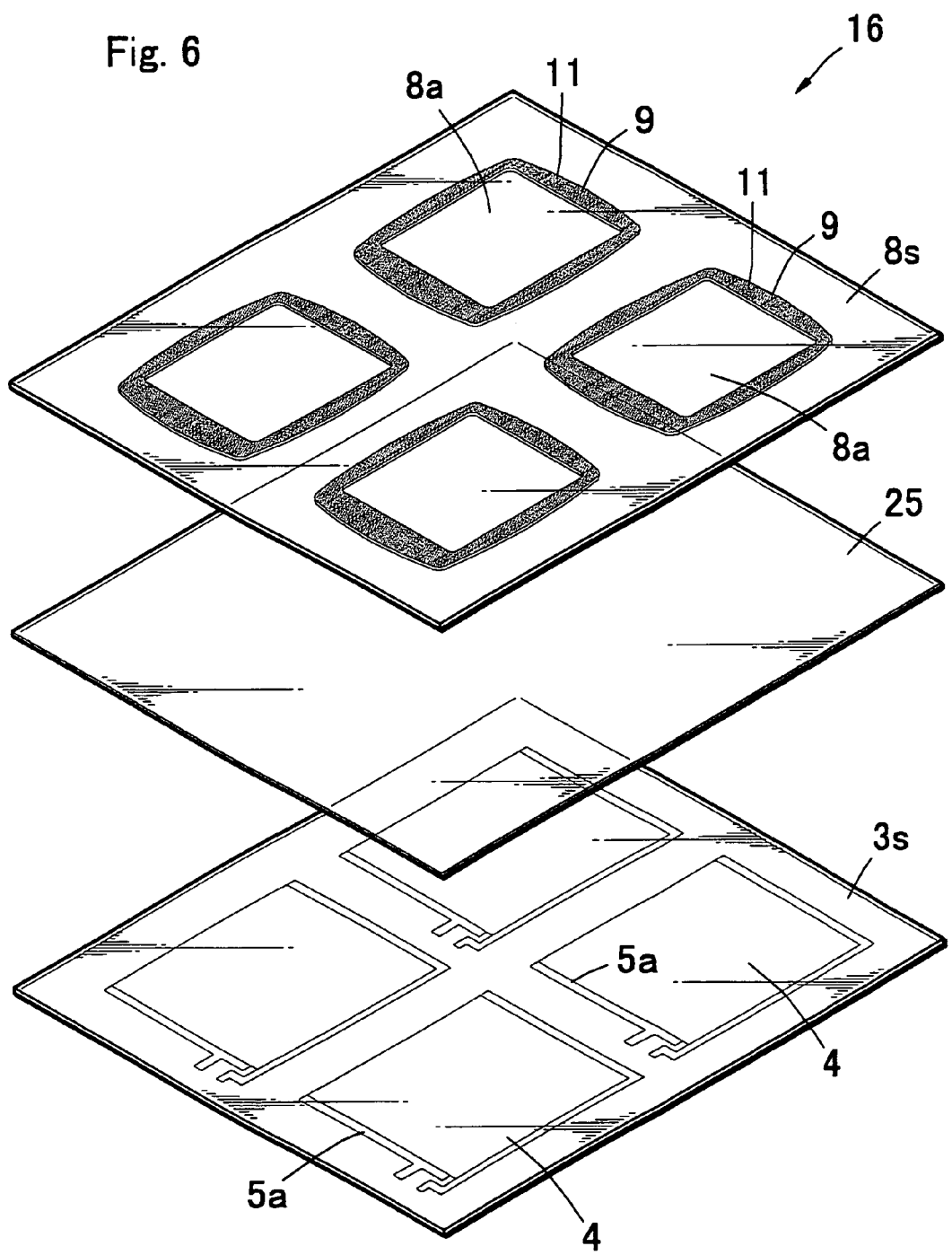
FIG. 6 is an assembly exploded perspective view of a transparent electrode film used in the protection panels for electronic device display window of FIG. 1.

FIG. 6 is an exploded perspective view showing the assembly configuration of the movable electrode film used in the protection panel of FIG. 1. The movable electrode film 16 is fabricated by bonding a transparent resin film 3s and a transparent resin cover film 8s with a transparent adhesive 25.

The transparent resin cover film 8s is a transparent sheet on the surface of which a plurality of decoration layers 9 are formed. In the example of FIG. 6, four decoration layers 9 are formed on one sheet of transparent resin cover film 8s. It is sufficient that the decoration layers 9 are formed on at least one surface of the transparent sheet. Preferably, the decoration layers are provided on the surface to be bonded to the transparent resin film 3s as described later.

The upper transparent electrodes 4 and the upper circuits 5a are formed on the lower surface of the transparent resin film 3s. Each upper transparent electrode 4 and each upper circuit 5a is formed in a smaller size than the outer dimension of the decoration layers 9 formed in the transparent resin cover film 8s, and arranged in positions corresponding to the decoration layer9 formed in the transparent resin cover film 8s. However, each of the upper transparent electrodes is formed preferably in a size approximately the same as or slightly larger than each of the transparent window sections 8a of the decoration layer 9 so that the upper circuit 5a is visually covered by the decoration section 11 outside the transparent window section 8a. The surface of the transparent resin cover film 8s on which the decoration layers are formed and the surface of the transparent resin film 3s on which the upper transparent electrodes 4 and the upper circuits 5a are not provided are bonded to the transparent resin film 3s with the transparent adhesive 25, so as to constitute the 10 movable electrode film 16. At that time, bonding is performed in a position in which each upper circuit 5a is visually covered by the decoration section 11 of each decoration layer 9 formed on the transparent resin cover film 8s.

Figure 7:
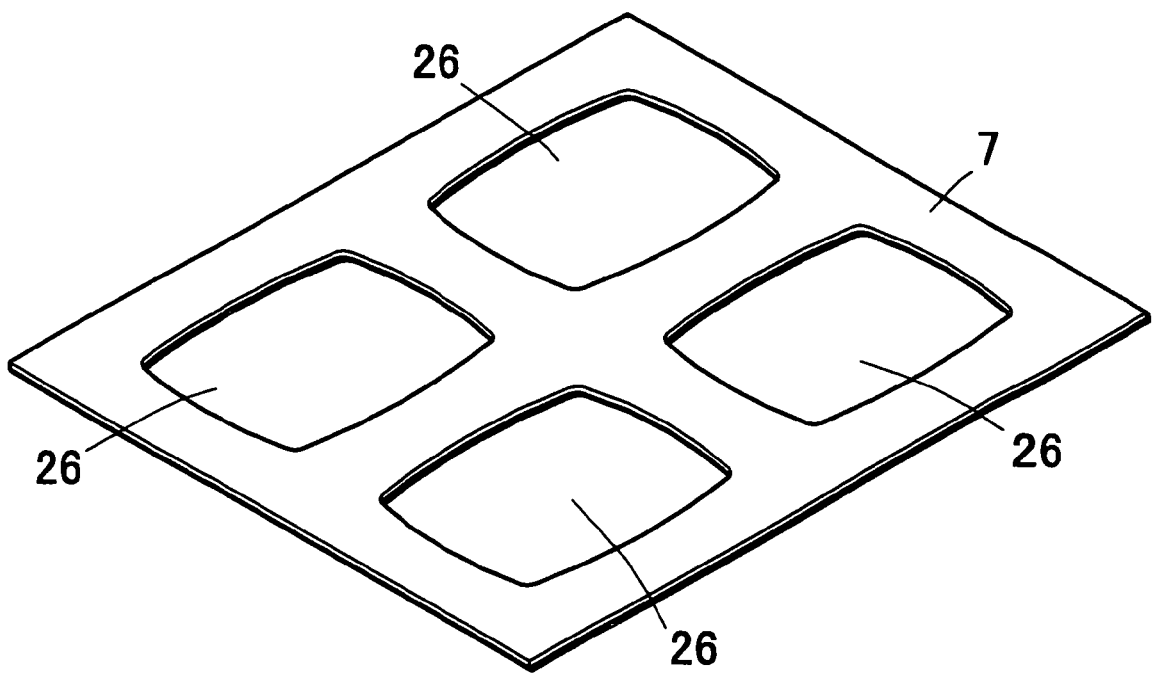
FIG. 7 is a perspective view of a double-sided adhesive tape used in the protection panels for the electronic device display window of FIG. 1.

FIG. 7 is a perspective view showing a double-sided adhesive tape used in the protection panel for electronic device display window of FIG. 1. The double-sided adhesive tape 7 is formed approximately in the same size as the movable electrode film 16. A cut out portion26 is formed in a corresponding position in which each decoration layer 9 of the movable electrode film is formed. The cut out portion 26 is formed in a size larger than the outer dimension of the upper transparent electrode 4 as well as smaller than the decoration layer 9. The double-sided adhesive tape 7 bonds the fixed electrode board 27 to the transparent resin film 3 so as to construct the protection panel main body 1 in such a manner that an air layer is formed between the electrodes.

Figure 8:
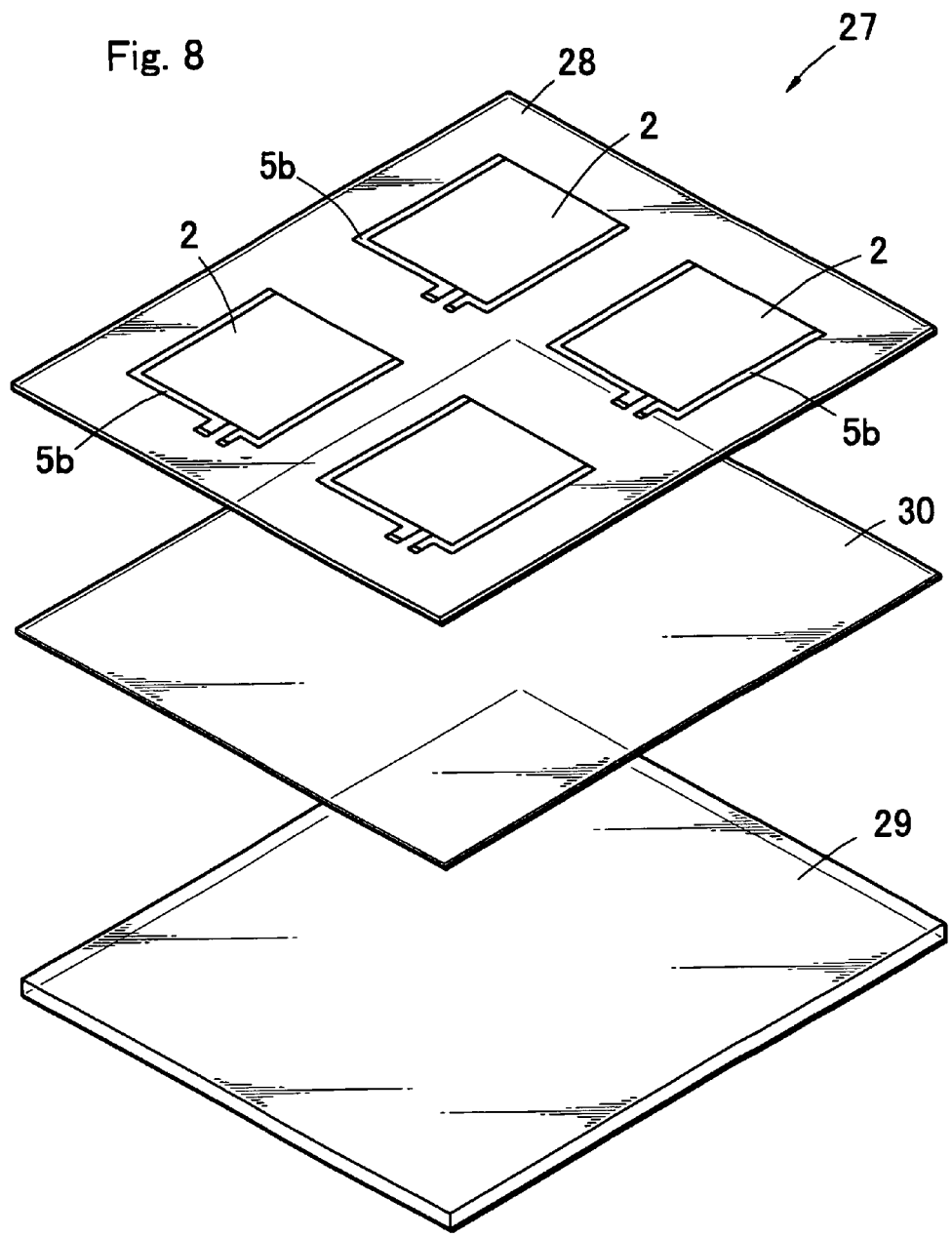
FIG. 8 is an assembly exploded perspective view of a fixed electrode board used in the protection panels for the electronic device display window of FIG. 1.

FIG. 8 is an assembly exploded perspective view of a fixed electrode board used in the protection panel for electronic device display window of FIG. 1. A fixed electrode board 27 is constructed in such a manner that a fixed electrode film 28 is bonded to the upper surface of a transparent plate member 29.

Lower transparent electrodes 2 and lower circuits 5b are formed on the upper surface of the fixed electrode film 28. Each lower transparent electrode 2 and each lower circuit 5b are formed in a size smaller than the outer dimension of each decoration layer 9 formed in the transparent resin cover film 8s as well as approximately in the same size as the upper transparent electrode 4 and the upper circuit 5a. The lower transparent electrode and the lower circuit are arranged in a position corresponding to the decoration layer 9 formed in the transparent resin cover film 8s.

Figure 9:
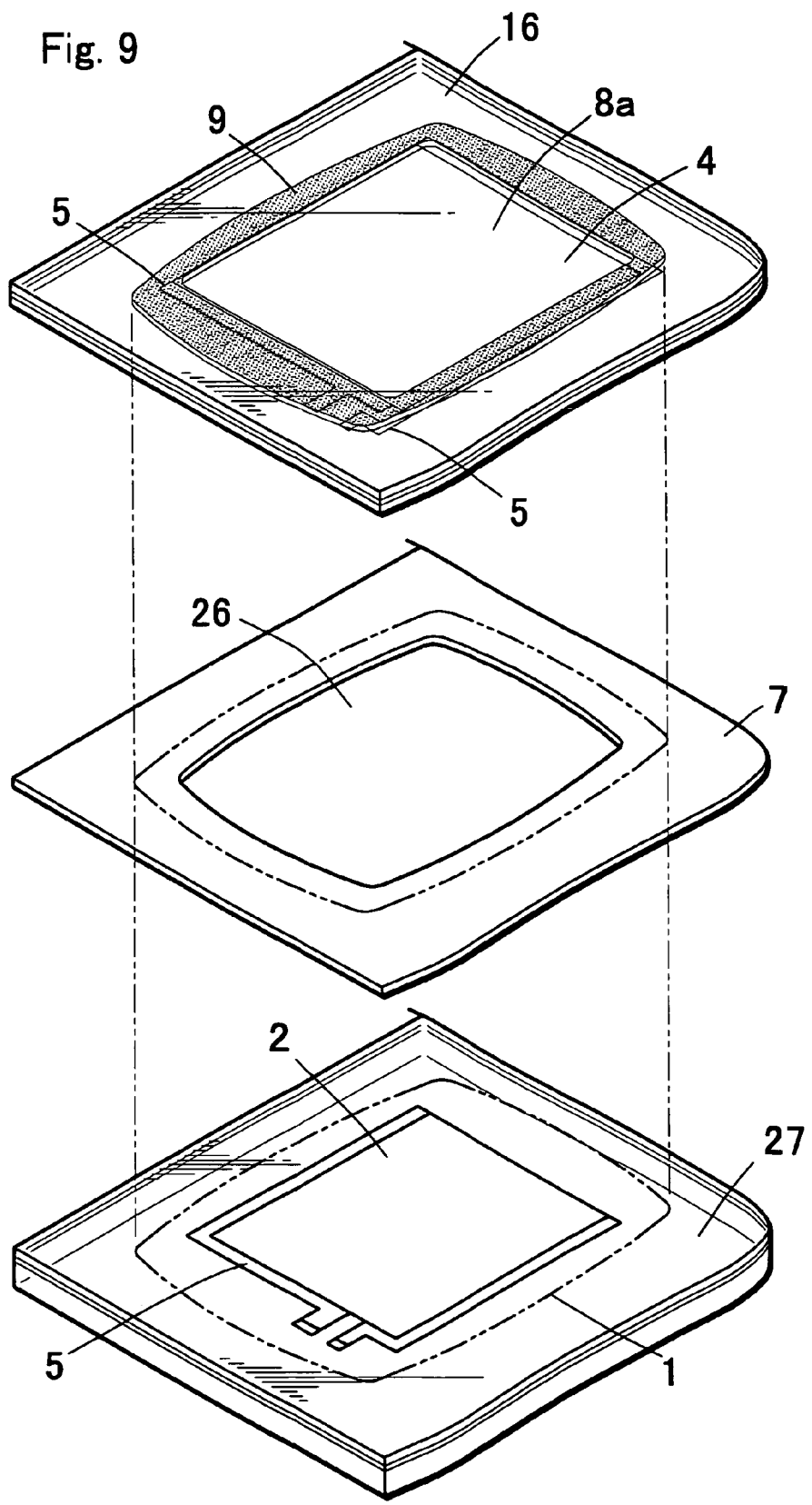
FIG. 9 is a partly expanded and assembly exploded perspective view illustrating the bonding positions of the transparent electrode film, the double-sided adhesive tape, and the fixed electrode board of the protection panels for an electronic device display window of FIG. 1.

The surface of the fixed electrode film on which the upper transparent electrodes 2 and lower circuits 5b are not provided is bonded to the plate member 29 with a transparent adhesive 30. After the bonding of these, spacers 10 are formed by fabricating a large number of fine dots according to the above-mentioned method or the like. The movable electrode film 16 and the fixed electrode board 27 having the above-mentioned configuration are bonded with the double-sided adhesive tape 7. At that time, the positional relation between these members is as shown in FIG. 9. That is, the decoration layer 9 is bonded in a position not allowing the upper transparent electrode 2, the lower transparent electrode 4, the upper circuit 5a, and the cut out portion 26 to protrude to the outside. At that time, the upper transparent electrode 2 and the lower transparent electrode 4 are bonded so that they are aligned within the cut out portion 26 of the double-sided adhesive tape. When these members are bonded in such a positional relation, only the circumferential portions of the upper transparent electrode 2, and the lower transparent electrode 4 are bonded with the double-sided adhesive tape7. Thus, only the circumferential portions are bonded in such a manner that an air layer is formed between the movable electrode film 16 and the fixed electrode board 27.

Figure 10:
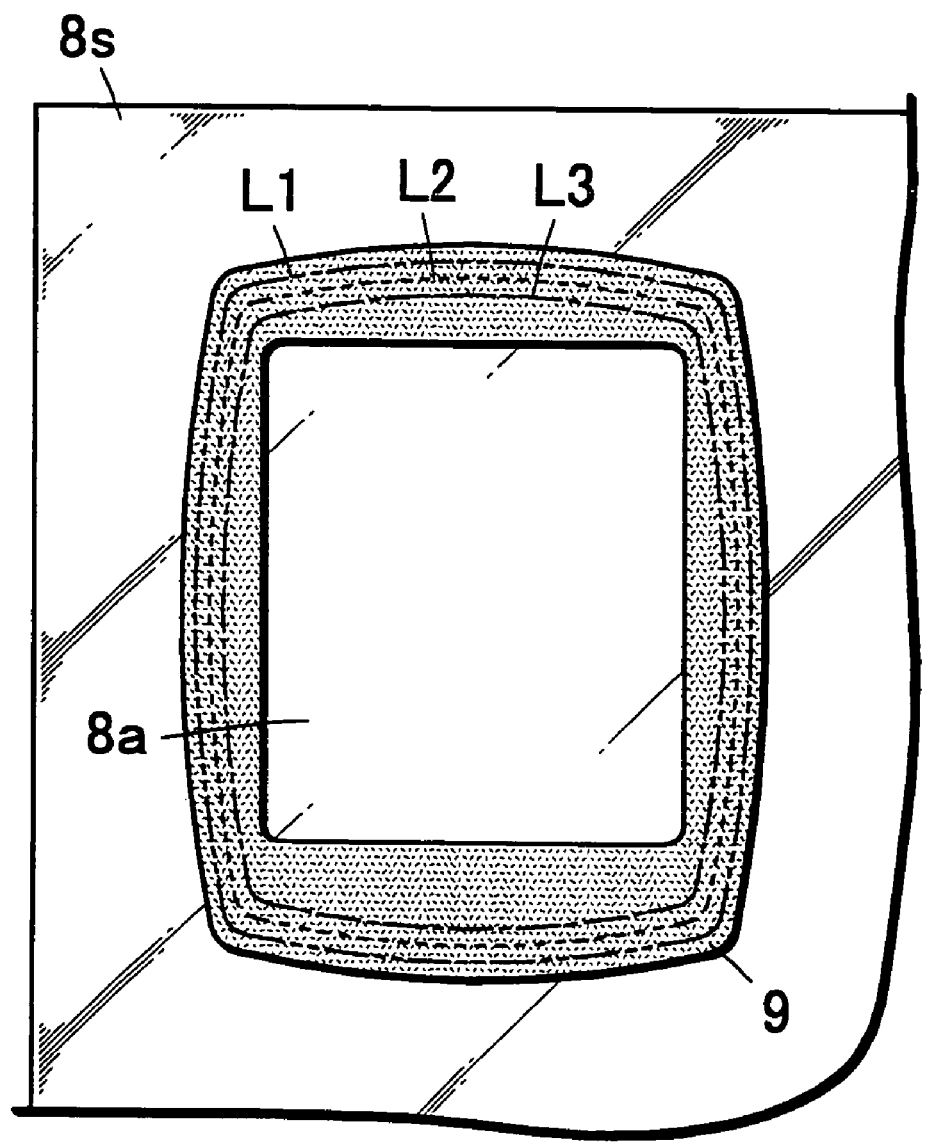
FIG. 10 is a diagram illustrating a position in which bonded members shown in FIG. 9 are to be cut up.

After the adhesion of these members, the movable electrode film 16 and the fixed electrode board 27 which have been bonded together are integrally cut up as shown in FIG. 10. Cutting is performed along a line L1 shown in FIG. 10, which is located outside the periphery L2 of the cut out portion 26 of the double-sided adhesive tape as well as outside the outer periphery L3 of the upper transparent electrode 2, and the lower transparent electrode 4. Further, the cutting line L1 is located in the vicinity of the inner periphery of the decoration layer 9. When the movable electrode film 16 and the fixed electrode board 27 which have been bonded together are integrally cut up in such alignment, the protection panel 100 thus obtained is configured that the transparent resin film cut out from the movable electrode film 16 and the protection panel main body 1 cut out from the fixed electrode board 27 are bonded together only in their peripheral portions and arranged such that an air layer is formed on the upper side of the protection panel main body.

Figure 12:
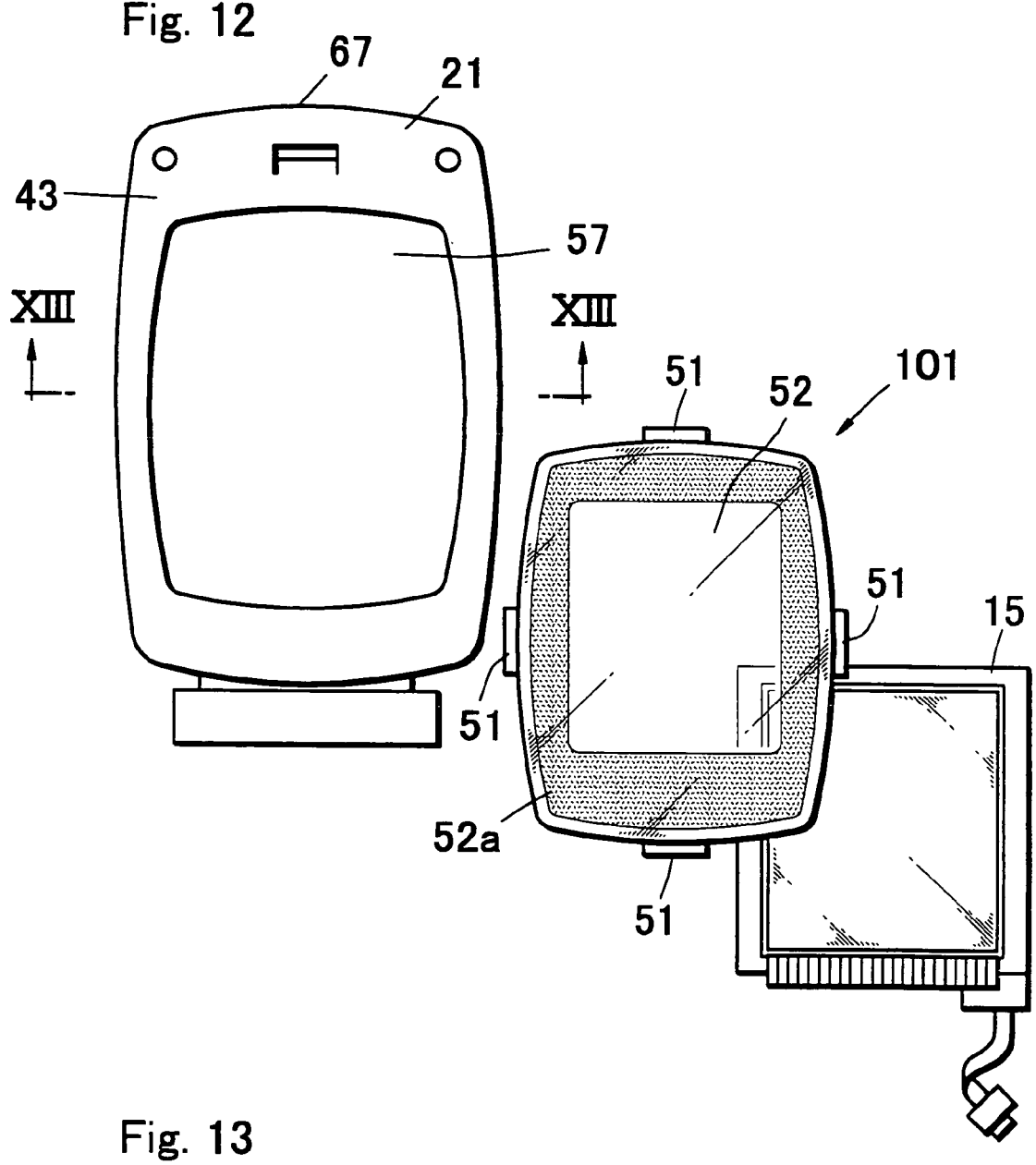
FIG. 12 is an exploded view showing another example of the mounting structure of a front casing employing the protection panel for an electronic device display window.
Figure 13:
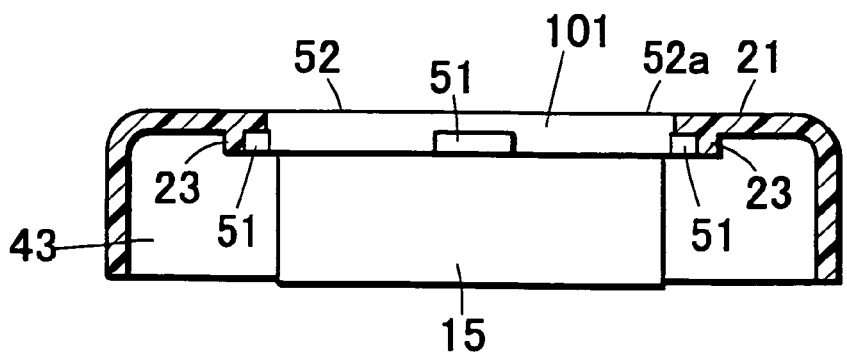
FIG. 13 is a cross sectional view showing another embodiment of the mounting structure of the front casing of FIG. 12.
Figure 14:
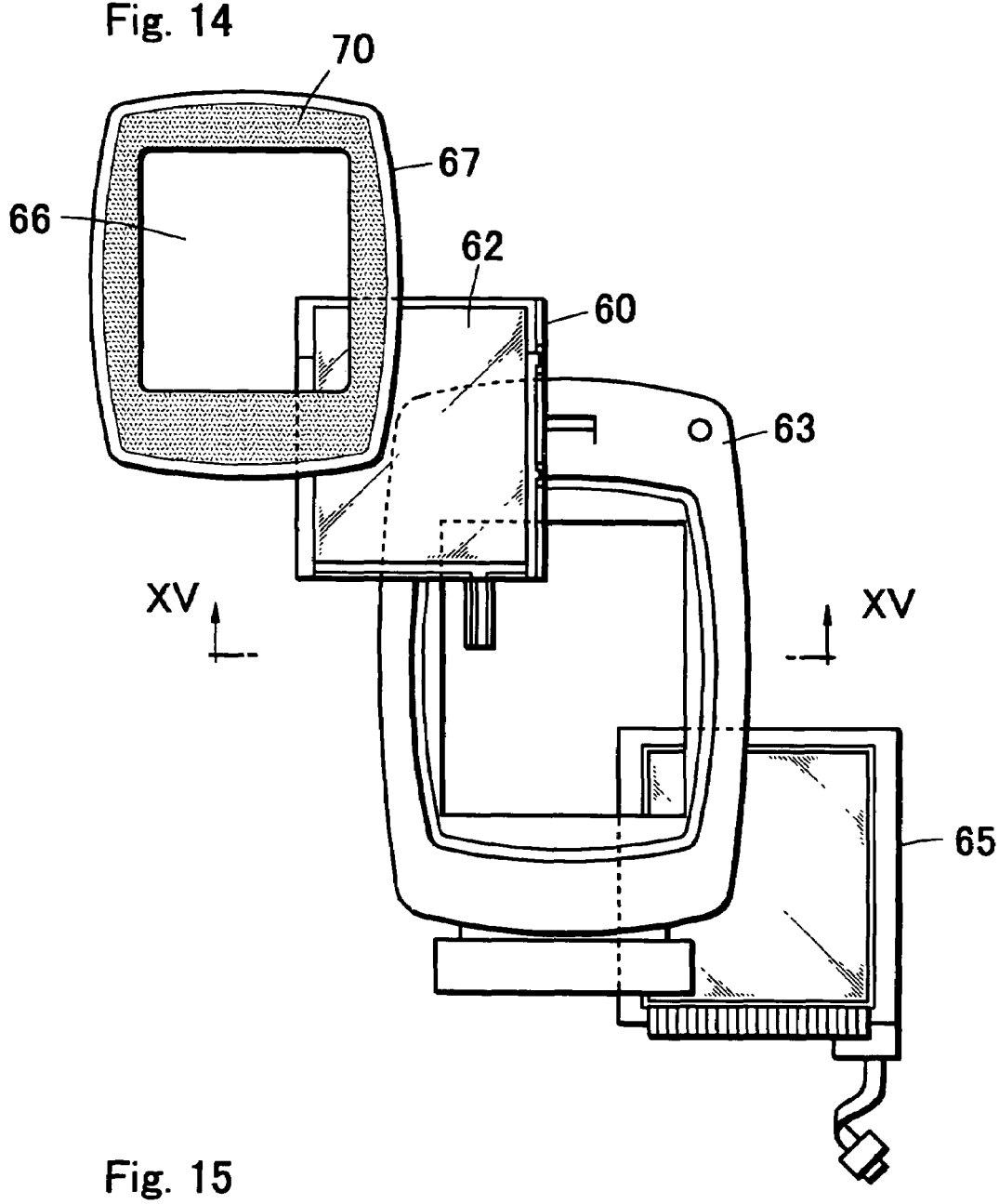
FIG. 14 is an exploded view showing an example of the mounting structure of a prior art front casing that adopts a front panel having an opening and employs a touch panel.
Figure 15:
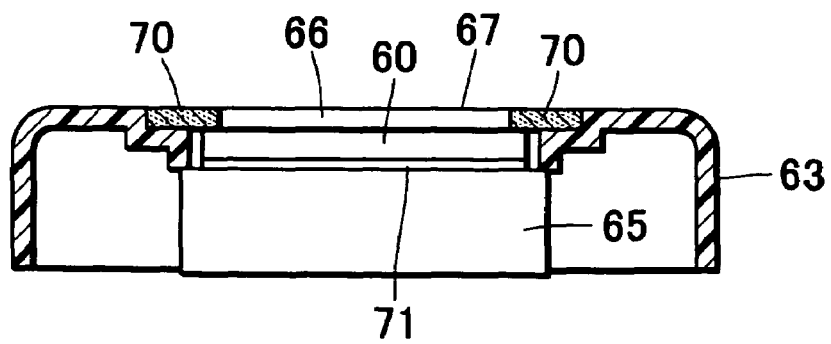
FIG. 15 is a cross sectional view showing an example of the mounting structure of the prior art front casing that adopts a front panel having an opening and employs a touch panel.

Next, a protection panel according to another embodiment of the present invention is described. As shown in FIGS. 12 and 13, this protection panel 101 is fitted into an opening 57 from the inside of a front casing 43 of a portable telephone. Protrusions 51 for locking to the casing 43 are provided partially in the periphery of the protection panel. In the present embodiment, such protrusions 51 are provided at four positions as shown in FIG. 12.

Each protrusion 51 is formed in a manner so as to have a smaller thickness than that of the protection panel 101. The protrusion is provided closer to the rear surface of the protection panel 101 so as to provide a level difference on a side of the touch input operation surface 52. The protrusion 51 is fitted to a fitting section 23 provided around an opening of the casing 43, whereby protection panel 101 is fixed to the casing 43. Since the level difference is provided so as to have a roughly equal dimension as the thickness of a wall of the casing around the opening, the touch input operation surface 52 of the protection panel 101 and outer surfaces of the casing are flush with each other.

In the protection panel with the above configuration, since the protection panel 101 is fixed to the casing 43 by the protrusions 51 protruding from an outline of the protection panel 101, the protection panel 101 roughly has the same outline as that of the opening formed in the casing, thus making it possible to place a display device 15 on the entirety of the opening. Therefore, the width of a peripheral portion 52a provided with the decoration layer is reduced to increase the area of the transparent window section. This can increase the size of a display window of an electronic device such as a portable telephone.

The protection panel 101 can be fabricated by bonding a movable electrode film and a fixed electrode board with a double-sided adhesive tape or the like as described above. However, since protrusions 51 having a smaller thickness than that of the protection panel are required to be provided, it is fabricated in the following manner.

In the fabrication of the protection panel 101, the movable electrode film, the fixed electrode board and the double-sided adhesive tape are used as mentioned above. The movable electrode film and the double-sided adhesive tape roughly have the same configurations as those shown in FIGS. 6 and 7, However slit-shaped through holes are provided in their respective portions corresponding to protrusions 51.

In portions of the fixed electrode board corresponding to protrusions 51 to be formed grooves having the same shape as that of the slit-shaped through holes provided in the movable electrode film and the double-sided adhesive tape are provided. When adjusting the thickness dimension of the protrusion 51, it is only necessary to adjust the depth of the corresponding groove. When the thickness of the protrusion 51 is equal to that of the fixed electrode board, no groove is required to be provided.

The movable electrode film and the fixed electrode board are bonded with the double-sided adhesive tape in a position in which the respective electrodes correspond to each other as shown in FIG. 9 mentioned above. At this time, the slit-shaped through holes respectively provided in the movable electrode film and the double-sided adhesive tape and the grooves provided in the fixed electrode board correspond to one another, so that non-through holes that are continuous from the upper surface of the integrated sheet are formed.

After that, the movable electrode film, fixed electrode board and double-sided adhesive tape are bonded to be integrated, and the resultant product is cut up along the outer periphery of the through holes and the grooves corresponding to the protrusions. A protection panel 101 thus cut up is configured so that the thickness of the through-holes and the grooves is reduced. Thus, the protrusions 51 are formed in the above portions.

The present invention is not limited to the above-mentioned embodiment, and can be carried out in various modes. For example, in the formation of both or either of the transparent lower electrode 2 and the transparent upper electrode 4, it is not indispensable that unnecessary portions are removed by etching after an electrically conductive coating is formed on the entire surface. That is, unnecessary portions may be covered by an insulating layer instead of etching. This insulating layer may be composed of an acrylacrylate resin or the like. The method of forming the insulating layer may be screen printing, a photography process, or the like. Laser patterning is also employable. Further, the insulating layer may serve also as an adhesive for bonding.

Furthermore, in place of the use of the film connector (circuit sheet) 18, a through hole may be provided in a peripheral portion of the protection panel main body 1 so that all terminals of the upper circuit 5a and the lower circuit 5b may be arranged toward the rear surface of the protection panel main body 1. In this case, the terminals of upper circuit 5a and the lower circuit 5b are arranged on the lower surface of the protection panel main body. Thus, terminals for contacting the terminals of the protection panel are preferably arranged on the bottom surface of the casing recess 22 for supporting the protection panel.

In place of the use of the double-sided adhesive tape 7, an adhesive composed of an acrylic resin, an epoxy resin, a phenol resin, a polyvinyl resin, or the like may be used.

Hard coat processing may be applied to the surface of the protection panel 100. When hard coat processing is performed, even if the decoration layer 9 is formed on the upper surface of the transparent resin cover film 8, the hard coat processed layer sufficiently protects the decoration layer 9 from wear caused by pressing with a finger, a pen, or the like. Employable hard coat processing methods include: applying of a hard coat material such as an acrylic resin, a silicone resin, and a UV hardening resin; and sticking of a hard coat film.

Low reflection processing may be applied to the surface of the protection panel 100. Employable low reflection processing methods include: applying of a low reflection material composed of a low refractive index resin such as a fluoro-resin and a silicone resin; forming of a metallic multilayer film by means of vapor deposition or the like; sticking of a low reflection film; and satin finishing of the surface by means of sandblast processing, emboss processing, mat coating processing, etching processing, or the like. These low reflection processing methods may be used in combination.

Antifouling processing may be applied to the surface of the protection panel 100.

Some of the above-mentioned hard coat processing, low reflection processing, and antifouling processing may be used in combination in the fabrication process.

EXAMPLE 1

An ITO film having a thickness of 20 nm was formed on the entirety of a surface of a PET film having the thickness of 0.1 mm by sputtering. Then, a peripheral portion of the ITO film was removed so that a transparent electrode was obtained in a broad rectangular shape. Bus bars arranged on the two mutually opposing sides in the horizontal direction of the transparent electrode, as well as a circuit for outputting the bus bars to the outside, were formed with silver paste by screen printing. An acrylic plate having the same lateral and vertical dimensions as the above-mentioned PET film and having a thickness of 0.7 mm was bonded to the opposite of the PET film surface on which the transparent electrode was formed, by means of a substrate-less transparent adhesive having a thickness of 0.025 mm. As a result, a fixed electrode board 27 on which a transparent electrode was formed was obtained.

Further, an ITO film having a thickness of 20 nm was formed by sputtering on the entirety of a surface of a PET film having the same horizontal and vertical dimensions as the protection panel main body and having a thickness of 125 pm. Then, a peripheral portion of the ITO film was removed so that a transparent electrode was obtained in a broad rectangular shape. Bus bars arranged on the two mutually opposing sides in the vertical direction of the transparent electrode, as well as a circuit for outputting the bus bars to the outside, were formed with silver paste by screen printing.

Further, a PET based hard coat film having the same size as the fixed electrode board 27 as well as having a thickness of 0.075 mm was used. A decoration layer having a transparent window section was formed by gravure printing on its surface opposite to the hard coat.

Then, the PET based hard coat film surface on which the decoration layer was formed was bonded to the opposite of the 125-pm PET film surface on which the transparent electrode was formed, by means of substrate-less transparent adhesive of a thickness of 0.025 mm. As a result, a movable electrode film was obtained. After that, the fixed electrode board and the movable electrode film were aligned such that the electrodes formed respectively on these members were separated. Then, their peripheral portions except for a portion for film connector insertion were bonded together with a double-sided adhesive tape. The bonded plate was cut along the inner periphery of the decoration layer.

Lastly, an end portion of the film connector was then bonded by thermo-compression bonding to the fixed electrode board and the movable electrode film having been cut. As a result, a protection panel for electronic device display window was obtained. This protection panel was fitted into a display window of the casing of an electronic device with protection panel.

In this protection panel, touch input was allowed in the display window of the electronic device such as a portable telephone. The touch input did not slide on the same portion of the operation surface. Further, fouling such as fats and oils was easily wiped off.

EXAMPLE 2

The dimensions of the above-mentioned PET based hard coat film were set larger by 5 mm than the circumference of the protection panel main body. Further, before the adhering to the PET film having a thickness of 125 pm, a frame composed of acrylic resin having a thickness of 0.7 mm and a width of 5 mm was integrated into the circumference (of the protection panel main body) by insert molding. Other structures were the same as Example 1.

In the obtained protection panel, touch input was allowed in the display window of the electronic device such as a portable telephone. The touch input did not slide on the same portion of the operation surface. Further, fouling such as fats and oils was easily wiped off.

The above-mentioned modes of operation may be combined in an arbitrary manner so that their effects are obtained in combination.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electronic device comprising:
   a protection panel including a decoration layer having a transparent window section;
   a casing including a panel fitting section having an opening, said protection panel being fitted into said panel fitting section such that outer surfaces of said protection panel and said casing are flush with each other; and
   a display device on a lower side of said protection panel and arranged so as to be visually recognizable from an outside of said electronic device through said transparent window section of said protection panel;
   wherein said protection panel further includes:
      a transparent protection panel main body having an upper surface with a transparent lower electrode thereon and a lower circuit arranged around said transparent lower electrode so as to be covered by said decoration layer, and having a lower surface with a notch therein for accommodating a circuit sheet connected to said lower circuit such that said circuit sheet accommodated within said notch is covered by said decoration layer;
      a movable electrode film including a transparent resin film having a lower surface with a transparent upper electrode located opposite to said transparent lower electrode and an upper circuit arranged around said transparent upper electrode so as to be covered by said decoration layer, said movable electrode film having peripheral portions bonded to said transparent protection panel main body such that an air layer is formed between said movable electrode film and an upper side of said protection panel main body; and
      a transparent resin cover film on an upper surface of said transparent resin film of said movable electrode film, said decoration layer being formed on at least one surface of said transparent resin cover film.

2. The electronic device of claim 1, wherein said decoration layer is formed on a lower surface of said transparent resin cover film.

3. The electronic device of claim 2, wherein transparent resin cover film has an upper surface which is at least one of hard coat processed, low reflection processed, and antifouling processed.

4. An electronic device claim 2, wherein said transparent resin cover film has outer dimensions identical to outer dimensions of said transparent resin film of said movable electrode film and said protection panel main body.

5. The electronic device of claim 4, wherein said transparent resin cover film has an upper surface which is at least one of hard coat processed, low reflection processed, and antifouling processed.

6. The electronic device of claim 1, wherein said transparent resin cover film has an upper surface which is at least one of hard coat processed, low reflection processed ,and antifouling processed.

7. The electronic device of claim 1, wherein said protection panel is fitted into said panel fitting section of said casing such that no gap is formed between said outer surfaces of said protection panel and said casing.

8. The electronic device of claim 1, wherein said transparent lower electrode of said transparent protection panel main body has an upper surface facing said transparent upper electrode of said movable electrode film, said upper surface of said transparent lower electrode having spacers formed thereon within said air layer.

9. A protection panel for use in an electronic device display window, said protection panel comprising:
   a decoration layer having a transparent window section;
   a transparent protection panel main body having an upper surface with a transparent lower electrode thereon and a lower circuit arranged around said transparent lower electrode so as to be covered by said decoration layer, and having a lower surface with a notch therein for accommodating a circuit sheet connected to said lower circuit such that said circuit sheet accommodated within said notch is covered by said decoration layer;
   a movable electrode film including a transparent resin film having a lower surface with a transparent upper electrode located opposite to said transparent lower electrode and an upper circuit arranged around said transparent upper electrode so as to be covered by said decoration layer, said movable electrode film having peripheral portions bonded to said transparent protection panel main body such that an air layer is formed between said movable electrode film and an upper side of said protection panel main body; and
   a transparent resin cover film on an upper surface of said transparent resin film of said movable electrode film, said decoration layer being formed on at least one surface of said transparent resin cover film.

10. The protection panel of claim 9, wherein said decoration layer is formed on a lower surface of said transparent resin cover film.

11. The protection panel of claim 10, wherein said transparent resin cover film has an upper surface which is at least one of hard coat processed, low reflection processed, and antifouling processed.

12. The protection panel of claim 10, wherein the cover film has the sane outer dimensions as the transparent resin film and the protection panel main body.

13. The protection panel of 12, wherein said transparent resin cover film has an upper surface which is at least one of hard coat processed, low reflection processed, and antifouling processed.

14. The protection panel of claim 9, wherein said transparent resin cover film has an upper surface which is at least one of hard coat processed, low reflection processed, and antifouling processed.

15. The protection panel of claim 9, wherein said transparent lower electrode of said transparent protection panel main body has an upper surface facing said transparent upper electrode of said movable electrode film, said upper surface of said transparent lower electrode having spacers formed thereon within said air layer.

16. The protection panel of claim 9, wherein said protection panel is shaped and designed to be fitted and retained in an opening of a panel fitting section of a casing such that outer surfaces of said protection panel and the casing are flush with each other, and such that a display device to be located at a lower side of said protection panel is visually recognizable through said transparent window section of said decoration layer.

17. The protection panel of claim 9, wherein said protection panel is shaped and designed to be fitted into the panel fitting section of the casing such that no gap is formed between outer surfaces of said protection panel and the casing.

* * * * *